Patented Nov. 19, 1946

2,411,237

UNITED STATES PATENT OFFICE 2,411,237

ADHESIVE SHEETS

George Townsend Turner, New York, N. Y., and Elwood Paul Wenzelberger, Plainfield, N. J., assignors to Johnson & Johnson, a corporation of New Jersey No Drawing. Application June 3, 1943,
Serial No. 489,434

2 Claims. (Cl. 117—68)

This invention relates to a plastic coating composition for sheet material useful as a backing for pressure sensitive surgical adhesive tape and for other purposes.

Back coatings for pressure sensitive adhesive tapes, particularly those used for surgical purposes, require certain definite characteristics. Termed "non-soilable," they should be such that dirt will not cling to the backing in service, and if soiled, capable of being easily washed clean. Sterilization is also a factor, and coatings of the character under consideration must be able to undergo, without detriment to the tape, the usual sterilizing conditions involving submission to steam at a gauge pressure of fifteen pounds for a period of 30–45 minutes.

Various materials have been suggested for coating adhesive tape among which are those having as a base, cellulose nitrate, cellulose acetate and ethyl cellulose, the last mentioned to date having been found the most satisfactory. However, all such materials possess certain disadvantages militating against their use. For example, in order to give such materials the required flexibility for coating cloth used as a backing for adhesive tape, plasticizers are necessary, but many plasticizers have a tendency to migrate into the adhesive mass, either directly as when the tape is rolled up, or through the cloth backing, thus rendering the tape unfit for service in a relatively short time. It is true some plasticizers have been used that are relatively free of this disadvantage, but those that have been found satisfactory are few.

Adverting again to the conditions encountered in sterilization, nitro-cellulose and cellulose acetate coatings are unstable at temperatures corresponding to steam at fifteen pound gauge pressure and therefore cannot be safely used when sterilization is required. Materials coated with ethyl cellulose may be sterilized in the usual way, but stiffening of the coating may result and where the coating is white pigmented, discoloration may follow.

According to one embodiment of the present invention, there is provided a "non-soilable" sterilizable coating for a pressure sensitive surgical adhesive tape backing comprising, as the film-forming constituent, a resin which is a fully polymerized reaction product formed from a terpene such as dipentene, with maleic anhydride and a polyhydric alcohol such as mono-ethylene glycol, diethylene glycol, triethylene glycol, glycerol, pentaerythritol, etc. The coatings may also include such materials as fillers and pigments for reasons hereinafter set forth. Such coatings may be entirely devoid of plasticizers with the accompanying advantage which freedom from such material affords.

The fully polymerized reaction products previously mentioned are sold by the Hercules Powder Company under the trade name Petrex Elastomer 6C and Petrex Elastomer 7C. These materials in a lower stage of polymerization are described in U. S. Patent 1,993,032. The film-forming constituents, i. e., the Elastomers herein referred to are in a fully gelled state of polymerization or polymerized substantially as far as the reaction will proceed at elevated temperatures.

Among the advantages of the improved coating is its ability to withstand heat. It may be subjected to relatively high temperatures without melting or decomposing and indeed is unaffected by any temperature that a cloth or paper backing can withstand without change of color. Because of its heat resistant ability, sterilization which is carried out at a temperature of 250° F, the temperature corresponding to 15 pound gauge pressure, presents no difficulty. The coating is water-resistant, i. e., it sheds water, and it is also insoluble in most of the common solvents such as water, alcohol, gasoline, and oils. The coating has flexibility, stretchability, and elasticity. To be more specific, the flexibility of the coating is such that a film .002" in thickness will not add more than 2% stiffness to cloth as measured on a standard Flexometer. When calendered or spread on coarse woven fabric the improved coating will stretch to the extent that the cloth will stretch on the bias, i. e., at least about 10% without flaking or fracture. While a fabric with the improved coating will recover slowly its original size after stretching, the coating nevertheless will follow the elasticity of the cloth and this is desirable particularly in an adhesive tape. In other words, the improved coating readily follows the distortion characteristics of the cloth without fracturing or flaking, stands up well under scuffing tests, does not add at all to the harshness of the cloth and indeed is soft and velvety to the touch.

The coating will not de-laminate or separate from its base when unwound from the roll nor will it cause the adhesive mass, which is in contact with it in a wound roll of adhesive tape, to de-laminate or separate from the backing. Furthermore, the coating has excellent aging characteristics and since it contains no plasticizers or material capable of migrating into the adhesive mass, it detracts nothing from the aging characteristics of the adhesive mass used on the backing in conjunction with it. The coating material may be either calendered or spread onto the surface of the backing material and, within reason, to any desirable thickness, or, if preferred, several layers may be surfaced on to the backing material, although usually one layer will suffice for most purposes.

Examples of different formulations that have proved successful as a calendered coat for adhesive tape backings, are as follows, the amounts given being in percent of total weight:

Example 1

| | |
|---|---|
| Petrex Elastomer 7C | 63.40 |
| Chalk (filler) | 23.92 |
| Pigment | 11.96 |
| Calcium stearate | .72 |
| Total | 100.00 |

Example 2

| | |
|---|---|
| Petrex Elastomer 6C | 31.97 |
| Starch (filler) | 63.94 |
| Titanium dioxide pigment | 3.20 |
| Calcium stearate | .89 |
| Total | 100.00 |

Example 3

| | |
|---|---|
| Petrex Elastomer 7C | 34.48 |
| Chalk (filler) | 47.42 |
| Zinc oxide (filler) | 17.24 |
| Calcium stearate | .86 |
| Total | 100.00 |

Example 4

| | |
|---|---|
| Petrex Elastomer 6C | 37.00 |
| Petrex Elastomer 7C | 13.00 |
| Superfloss—diatomaceous earth (filler) | 32.00 |
| Titanium dioxide (pigment) | 15.00 |
| Calcium stearate | 3.00 |
| Total | 100.00 |

Example 5

| | |
|---|---|
| Petrex Elastomer 6C | 34.56 |
| Petrex Elastomer 7C | 14.95 |
| Superfloss—diatomaceous earth (filler) | 29.89 |
| Titanium dioxide | 18.68 |
| Calcium stearate | 1.87 |
| Ultramarine Blue | .05 |
| Total | 100.00 |

In all of the examples given, the fully polymerized resin is the film-forming constituent that imparts to the coating the desirable properties hereinbefore set forth. The filler serves as an extender for the resin, acts to reduce tack, and promotes firmness in the coating. While the titanium dioxide serves to make the coating white, it likewise acts in the nature of a filler and it will be understood that other pigments, litho colors or dyes may be used, depending upon the color of coating desired. Other materials suggested for fillers are antimonic oxide, magnesium carbonate, gypsum, asbestos, china clay, lithopone, whiting, etc. These materials are given merely by way of example, it being understood that other such materials may be used with equal efficacy and in different proportions as compared with the color pigment and depending upon the shade of color it is desired to produce. Aluminum stearate, stearic acid, or other similar materials may be used in place of or in combination with the calcium stearate to serve as a lubricant. The chief purpose of the lubricant is to aid in the calendering of the material on to the cloth backing and, like the filler material, it serves to reduce tack. The ultramarine blue serves to offset the yellow color of the resins and is used to obtain a good white.

The formulation given above under Example 5 is that most preferred as a white coating for a backing for sterilizable adhesive tape. However, excellent coatings may be obtained with suitable variations in the percentage of ingredients used. For instance, the percentage of resin may vary approximately from 30% to 65% and the remainder of materials, chief of which is the filler, from 35% to 70% of the total weight of the composition. The amount of filler used will depend upon the temperature and power available for the calendering operation. The resin may be one or the other or a mixture in any proportions of the substantially fully polymerized Petrex Elastomer 6C and 7C depending upon the degree of softness desired. The amount of lubricant may be varied from .5% to 6% and where calcium stearate is used the amount preferably should not exceed 2%. As to the blue pigment, not over .06% will be required in any instance to counteract the yellow color of the film-forming resins.

In some instances it may be desirable to add a fluxing agent to soften the composition and facilitate the calendering operation. Thus, any suitable material or synthetic resin will suffice provided its melting point is not so low as to have a harmful effect upon the coating during sterilization. Materials that will suffice include Staybellite resin, which is a hydrogenated rosin, Poly-Pale resin, which is a product of polymerized rosin acid, and the glycol and glycerol esters of these resins. These materials are available under the names given and are manufactured by Hercules Powder Company. Another suitable fluxing agent is a resin likewise manufactured by Hercules Powder Company under the designation 2190—26. This resin is a three-dimensional polymer reacted from an alkyd resin produced from monobasic resin acids with a polyhydric alcohol and a polycarboxylic acid. The amount of fluxing agent used in any given instance will depend upon the workability of the batch during calendering, which in turn depends upon its composition, the degree or stage to which the polymerization of the Petrex Elastomer has been carried out, and the calendering temperature. One skilled in calendering operations will be able readily to ascertain what the proper amount should be.

In preparing the coating composition, the resin or resins, as the case may be, are worked at a temperature to give the desired degree of softness. Good coatings have been obtained by working the resin in an ordinary mixing roll or a Banbury mixer using temperatures as high as 285° F. Mixing is continued until the resins are in a homogeneous state whereupon the filler is added and worked in. The same procedure is followed with the pigment as with the filler. The important fact to remember as regards the working temperature and also as regards the subsequent calendering temperature is that these temperatures should not be such as to effect further polymerization of the film-forming resin during those operations, otherwise it will be difficult to control the ultimate properties of the coating material. To be more explicit, while the use of fully polymerized Petrex Elastomer is preferred, no assurance can be had that the polymerization of the commercial product has been carried out to its full extent. Proper control of the working and calendering temperatures will insure that no further polymerization will take place causing an unexpected variation in the properties of the finished coating in those cases where polymerization in the commercial Elastomer has not been carried to the end point.

After the filler and pigment have been properly incorporated with the resins the lubricant is added, and this effects a noticeable transformation in the mix which changes from a soft, irregular condition to a smooth, velvety and nontacky condition.

The batch as thus prepared is ready for the calendering operation. Preferably it should be in a warm condition for this purpose although if used immediately after it is compounded it will be sufficiently warm without a further heating operation. However, if it has been stored for later calendering, it is preferable to pre-warm the batch just before the calendering operation is carried out. The fabric is coated on a conventional three-roll calender, having a top roll and a center roll operating at different surface speeds and a bottom roll operating at the same speed as the center roll. For reasons well understood, best results are obtained by maintaining a temperature differential between the top and center rolls and between the center and bottom rolls which permits a ready transfer of the batch to the center roll and then to the fabric which is threaded around the bottom roll. The bottom roll is maintained at a temperature which will facilitate transfer of the mass to the cloth and insure its proper anchorage thereto. The thickness of the coating film is determined by the spacing of the top and center rolls, whereas the spacing between the center and bottom rolls determines the extent to which the coating is pressed into the meshes of the cloth fabric. After the coated fabric web leaves the calender roll it is preferably run over a cooling roll before winding. Calendering temperatures may vary depending upon the composition of the coating and upon the calender used. For instance, a composition similar to Example 5 given heretofore was calendered on cloth on a standard calender in which the top roll was adjusted to a temperature of 200° F., the center roll about 160° F., and the bottom roll about 100° F. These temperatures are merely illustrative.

There is no limitation upon the type of fabric that may be used, i. e., it may be bleached or unbleached, sized or unsized, colored or uncolored cloth of any desired count or weight. It may be of any natural or synthetic fibers having either a plain or special weave.

Where embossing is desired, that may be done in the usual way after which an adhesive mass may be applied to the fabric on the side opposite the coating as when the coated fabric is to be used as a backing for a pressure sensitive adhesive tape.

Any suitable pressure sensitive mass may be used so long as its constituents work no detriment to the constituents of the resin backing and vice versa. Most of those in use today are satisfactory.

In making up adhesive bandages the pad portions are applied, the bandages cut to size, placed in envelopes, sealed, and sterilized. It has been found that adhesive bandages having a backing made in accordance with the instant invention may be sterilized with substantially no detriment to the color and without sticking to the envelopes.

While a coating made according to the instant invention is eminently suitable for surfacing material used for adhesive tape backing, it has many other applications because of the various qualities it possesses. Thus, it may be used as a coating for raincoat material, gas masks, hospital sheeting, and for many other purposes as well. Furthermore, its use is not limited to surfacing cloth since it may also be applied as a surface coating on metal, paper, fiber sheeting, textile or floor surfaces.

The invention has been described merely by way of example and is susceptible of many modifications within its spirit. It will be understood therefore that the invention is to be limited only by the prior art and the scope of the appended claims.

We claim:

1. Sheet material suitable for use as a backing for adhesive tape and for other purposes and which is provided, on one of its surfaces, with a non-tacky coating characterized by softness, flexibility, excellent resistance to scuffing tests, substantial freedom fom flaking, and the ability to withstand sterilizing temperatures without melting or decomposing, said coating comprising from 30 to 65% by weight of a substantially polymerized reaction product formed from a terpene with maleic anhydride and a polyhydric alcohol, and from 35 to 70% by weight of additional material comprising mostly a filler.

2. Sheet material suitable for use as a backing for surgical adhesive tape and for other purposes and which is provided, on one of its surfaces, with a calendered non-tacky coating characterized by softness, flexibility, excellent resistance to scuffing tests, substantial freedom from flaking and the ability to withstand sterilizing temperatures without melting or decomposing, said coating comprising from 30 to 65% by weight of a substantially fully polymerized reaction product formed from a terpene with maleic anhydride and a polyhydric alcohol, and from 35 to 70% by weight of additional material comprising mostly a filler with a small proportion of a lubricant to aid in the calendering operation.

GEORGE TOWNSEND TURNER.
ELWOOD PAUL WENZELBERGER.